United States Statutory Invention Registration [19]

[11] Reg. Number: H210

Harris

[43] Published: Feb. 3, 1987

[54] BI-INPUT SAFE DETONATOR

[75] Inventor: Paul Harris, Morristown, N.J.

[73] Assignee: The United States of America as represented by the Secretary of the Army, Washington, D.C.

[21] Appl. No.: 815,499

[22] Filed: Jan. 2, 1986

Related U.S. Application Data

[63] Continuation of Ser. No. 713,132, Mar. 18, 1985.

[51] Int. Cl.[4] ..... F42C 11/02

[52] U.S. Cl. ..... 102/210

*Primary Examiner*—Richard D. Lovering
*Assistant Examiner*—Eric Jorgensen
*Attorney, Agent, or Firm*—Anthony T. Lane; Harold H. Card, Jr.; Michael C. Sachs

[57] ABSTRACT

A detonator comprises a housing which contains a weak explosive charge ignitable by a bridge wire and a piezoelectric semiconductor buffer positioned in the housing for receiving a shockwave from the weak explosive charge when it is ignited. A high voltage lead is connected to the buffer for applying a high voltage signal to the buffer. If the high voltage signal is applied to the buffer at the same time that the weak explosive charge is ignited, the piezoelectric buffer will amplify a shockwave from the ignited charge to produce a detonation charge of sufficient amplitude to ignite a secondary or main charge which can form part of the detonator or be positioned against a surface of the detonator. In this way only the simultaneous ignition of the weak explosive charge and the activation of the piezoelectric buffer will cause ignition of the secondary or main charge. The weak charge itself is insufficient to ignite the secondary or main charge and application of a high voltage signal to the buffer alone produces an insufficiently high impulse for this purpose.

9 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

50
52
1,000 v.
-
+
54
18
28
26
24
44
42
40
32
34
16
14
22
10
20
30
12
36
38
18

50
52
1,000 v.
-
+
54
18
28
26
24
44
42
40
32
34
38'
12'
16
14
22
30
20
18

BI-INPUT SAFE DETONATOR

STATEMENT OF GOVERNMENT INTEREST

The invention described herein may be manufactured, used and licensed by or for the Government for Governmental purposes without the payment to me of any royalties thereon.

This application is a continuation, of application Ser. No. 713,132, filed Mar. 18, 1985.

FIELD AND BACKGROUND OF THE INVENTION

The present invention relates in general to explosive devices and in particular to a new and useful detonator which requires the simultaneous application of two voltage signals to detonate. One voltage signal is applied to a detonator bridge wire for igniting a weak explosive charge while the other voltage signal, in the form of a high voltage DC pulse, is applied to a piezoelectric semiconductor buffer in the detonator. The detonator is designed to provide an impulse of sufficient amplitude only if the weak explosive and buffer are activated simultaneously. An impulse from either the weak explosive or the buffer alone is insufficient to ignite a secondary of main explosive charge associated with the detonator. The buffer acts to amplify a shockwave from the weak explosive to produce an amplified shockwave of sufficient strength to ignite the secondary of main explosive charge.

Detonators which can be ignited by applying a voltage to a bridge wire alone can be unsafe because of the simplicity of igniting such detonators. Known detonators include a primary explosive main charge which is used for example to ignite a secondary explosive charge, or for other purposes.

Piezoelectric semiconductor devices are also known which, when receiving an electric impulse, produce a mechanical response. Conversely a mechanical impulse on such devices produces an electrical response. Experiments dealing with infinitesimal amplitude (ultrasonic) effect physics of piezoelectric devices can be found in an article by A. R. Hudson, J. H. McFee, and D. L. White, in *Physical Review Letters*, 7, page 237 (1961). Theory concerning these effects is discussed in an article by D. L. White in *J. Appl. Phys.*, 33, page 2547 (1962).

SUMMARY OF THE INVENTION

The present invention is drawn to a detonator which requires two simultaneous inputs before the detonator produces a sufficient shockwave to ignite a secondary explosive forming part of the detonator, or a main explosive charge which is external of the detonator.

According to the invention the detonator includes a weak explosive which can be ignited by a bridge wire to produce a shockwave. The detonator includes a piezoelectric semiconductor buffer which receives the shockwave and which, when activated by a suitably high voltage impulse, amplifies the shockwave to produce an amplified shockwave of sufficient amplitude to ignite the secondary or main explosive charge.

If voltage signals to the bridge wire and buffer are not simultaneous, the amplitude of a shockwave from the detonator will be insufficiently high to detonate the secondary or main explosive charge. The inventive detonator is thus safer to operate than detonators which only require a signal on a bridge wire since two simultaneous signals must be applied or else a sufficiently effective detonation will not occur.

Accordingly an object of the present invention is to provide a detonator comprising, a housing, a weak explosive charge in the housing, a bridge wire associated with the weak explosive charge which is activatable to ignite the weak explosive charge, first power supply means connected to the wire for activating the wire to ignite the weak charge and produce a shockwave, a piezoelectric semiconductor buffer in the housing positioned to receive the shockwave and second power supply means connected to the buffer for activating the buffer to amplify the shockwave from the weak charge to produce a detonation wave sufficient to ignite a secondary or main explosive charge. The first and second power supply means must activate the wire and buffer substantially at the same time for the amplification effect to take place. Otherwise the shockwave alone or an impulse from the piezoelectric buffer alone are insufficient to ignite the secondary or main charge.

A further object of the invention is to incorporate a secondary charge in the housing which can be ignited by the detonation wave but which cannot be ignited by the shockwave alone or by an impulse of the piezoelectric semiconductor buffer alone.

A still further object of the invention is to provide a detonator which is safer to operate than prior art detonators in that two simultaneous inputs must be established before the detonator will detonate.

Another object of the invention is to provide a bi-input safe detonator which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, references is made to the accompanying drawings and descriptive matter in which preferred embodiments of the invention are illustrated.

DESCRIPTION OF THE PREFERRED EMBODIMENTS

Figure 1:
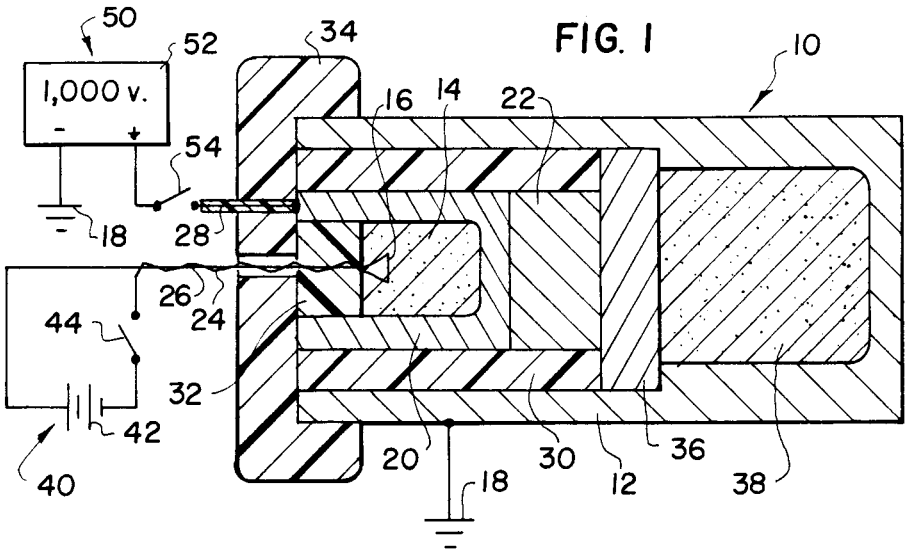
FIG. 1 is a side sectional view showing one embodiment of the inventive detonator.

Referring to FIG. 1, the invention embodied therein comprises a bi-input detonator generally designated 10 which has a housing 12 that is preferably metallic and electrically grounded at 18. Housing 12 defines a space which contains a weak explosive charge 14. Charge 14 is surrounded by a metallic casing 20 which acts as an electrode for an n-type piezoelectric semiconductor buffer 22.

A bridge wire 16 extends in weak charge 14 and is connected to bridge wire leads 24 and 26.

An insulated high voltage lead 28 is connected to the electrode 20.

The buffer 22 has a length along the central axis of detonator 10 which is about one centimeter. The buffer 22 as well as the electrode or casing 20 is surrounded by an electric insulator layer 30 made for example of plastic or ceramic. An insert filler 32 made of inert material plugs the opening of casing 20 and retains the charge 14 therein. Leads 24,26 extend through this filler.

Casing 12 is closed by an insulating end cap 34. Leads 24,26 as well as insulated high voltage lead 28 extend through this end cap.

On a side of buffer 22 opposite from the charge 14 is a second metal electrode 36. Since metal electrode 36 is in contact with buffer 22 as well as metal housing 12, the piezoelectric buffer 22 can be electrically activated over insulated lead 28 and ground 18.

In the embodiment of FIG. 1, housing 12 also defines a space which contains a secondary explosive 38 adjacent the second electrode 36.

Leads 24 and 26 for bridge wire 16 form part of first power supply means generally designated 40. These means are shown schematically to include a battery 42 and a switch 44 which can be closed to apply a voltage to wire 16 for the purpose of igniting weak explosive charge 14.

Insulated high voltage lead 28 forms part of a second power supply means 50 which includes a switch schematically shown at 54 and a high voltage source 52 connected between switch 52 and a ground which as with the ground connected to housing 12, is numbered 18.

Means 40 and 50 are shown only schematically. Any known mechanism for applying signals to wire 16 and buffer 22 can replace these means. The switches 44 and 54 are also shown schematically.

In operation, a signal is applied to wire 16 to ignite weak explosive charge 14. Simultaneously a sufficiently high voltage is applied to the insulated high voltage lead 28. The effect of this is to amplify a shockwave from the ignited charge 14 to the buffer 22. The shockwave is only amplified when both the buffer and the charge are activated substantially at the same time.

The amplified shockwave, termed a detonation wave, is only then sufficiently high to detonate the secondary explosive charge 38. The amplified shockwave is transmitted through electrode 36 which has a thickness selected for this purpose.

With an n-type piezoelectric semiconductor buffer 22 of one centimeter in thickness, approximately one thousand volts must be applied to insulated high voltage lead 28. The n-type piezoelectric material for example may be cadmium sulfide with an electron mobility of about $10^{-2}$ Mks units.

For a p-type buffer 22, the insulated high voltage lead 28 is provided with a negative voltage in order to produce the shockwave amplification effect.

The shockwave amplification occurs by virtue of accelerated electrons transferring energy and momemtum to the mass density shockwave which was applied by the igniting charge 14 on the buffer 22. In order to transfer momemtum and energy to the shockwave the electron drift velocity must be formed with an electric field of approximately one thousand volts per centimeter. This accounts for the required one thousand volts applied to the one centimeter thick buffer 22.

If the charge 14 is ignited without applying a voltage to buffer 22, or if the buffer 22 receives the high voltage signal but charge 14 is not ignited, a resulting shockwave is insufficient to ignite the secondary charge 38. In this way a safety feature is realized in that both buffer 22 and charge 14 must be activated at substantially the same time or else the detonator will not operate.

Figure 2:
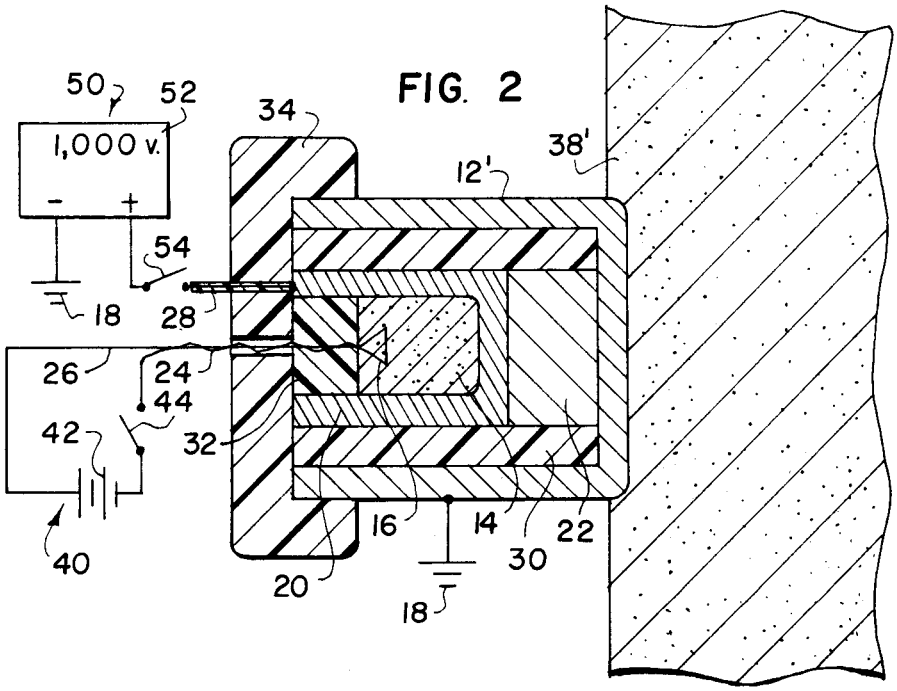
FIG. 2 is view similar to FIG. 1 showing another embodiment of the inventive detonator.

FIG. 2 shows an alternate embodiment of the invention wherein the same reference numerals are utilized to designate the same parts. As with the embodiment of FIG. 1, bridge wire 16 can be activated by its lead wires 24 and 26 by a first power supply means (not shown in FIG. 2).

Insulated lead wire 28 in FIG. 2 is connected over a first electrode 30 to the buffer 22. Weak charge 14 is disposed in a space defined by electrode 30 and is held in that space by a plug 32 through which wires 24,26 extend.

The end of a housing 12' is closed by an insulated end cap 34 which, as in FIG. 1, is glued in place.

Unlike the embodiment of FIG. 1, housing 12' is shortened and does not include a space for a secondary explosive charge. The housing 12' is grounded at 18 and forms a second electrode for buffer 22. The end of housing 12 opposite end cap 34 is engaged against a main secondary charge 38' which can only be ignited with the simultaneous activation of weak charge 14 and buffer 22. Only when this happens will a detonation wave from the end of housing 12' be sufficiently high in amplitude to ignite main charge 38'.

While specific embodiments of the invention have been shown and described in detail to illustrate the application of the principles of the invention, it will be understood that the invention may be embodied otherwise without departing from such principles.

What is claimed is:

1. A detonator comprising:

a housing;

a weak explosive charge in said housing;

a wire associated with said weak explosive charge which is activatable to ignite said weak explosive charge;

first power supply means connected to said wire for activating said wire to ignite said weak explosive charge and produce a shockwave;

a piezoelectric semiconductor buffer in said casing positioned to receive the shockwave; and second power supply means connected to said buffer for activating said buffer to amplify the shockwave when said first power supply means activates said wire at substantially the same time that said second power supply means activates said buffer, to produce an amplified detonation wave.

2. A detonator according to claim 1, wherein said second power supply means comprises a first electrode engaged against one side of said buffer and defining a space, said weak explosive charge disposed in said space, said second power supply means including a second electrode engaged with an opposite side of said buffer which is disposed away from said weak explosive charge.

3. A detonator according to claim 2, wherein said first power supply means includes a pair of leads connected to said wire for applying voltage to said wire to ignite said weak explosive charge.

4. A detonator according to claim 3, wherein said housing includes an open end, an insulating end cap engaged over and closing said open end, said leads for said wire extending through said end cap, said second power supply means including an insulated high voltage lead connected to said first electrode and extending through said end cap.

5. A detonator according to claim 4, wherein said housing is metallic and is connected to said second electrode, said housing defining a space on a side of said second electrode opposite said buffer, and a secondary explosive in said space of said housing for detonation upon receiving the amplified detonation wave.

6. A detonator according to claim 4, wherein said housing is metallic and forms said second electrode by engaging a side of said buffer opposite from said first electrode.

7. A detonator according to claim 4, wherein said piezoelectric semiconductor buffer is made of n-type material, said second power supply means comprising a source of positive voltage for application to said first electrode.

8. A detonator according to claim 4, wherein said piezoelectric semiconductor buffer is made of p-type material, said second power supply means provided for applying a negative voltage to said first electrode.

9. A method of detonating a secondary explosive charge comprising igniting a weak explosive charge at a selected time to produce a shockwave which by itself is insufficient to ignite the secondary charge, providing a piezoelectric semiconductor buffer between the weak explosive charge and the secondary charge, and applying voltage to the buffer at the selected time for amplifying a shockwave to produce a detonation wave for the secondary explosive of sufficient high amplitude to ignite the secondary explosive.

* * * * *